United States Patent
Iguchi et al.

(10) Patent No.: US 8,841,224 B2
(45) Date of Patent: Sep. 23, 2014

(54) DIELECTRIC CERAMIC COMPOSITION AND ELECTRONIC DEVICE

(71) Applicant: TDK Corporation, Tokyo (JP)

(72) Inventors: Toshihiro Iguchi, Tokyo (JP); Akitoshi Yoshii, Tokyo (JP); Tatsuya Kojima, Tokyo (JP); Satoshi Takagi, Tokyo (JP)

(73) Assignee: TDK Corporation, Tokyo (JP)

( * ) Notice: Subject to any disclaimer, the term of this patent is extended or adjusted under 35 U.S.C. 154(b) by 56 days.

(21) Appl. No.: 13/773,347

(22) Filed: Feb. 21, 2013

(65) Prior Publication Data

US 2013/0222974 A1 Aug. 29, 2013

(30) Foreign Application Priority Data

Feb. 29, 2012 (JP) ................................. 2012-044014

(51) Int. Cl.
| | |
|---|---|
| *C04B 35/495* | (2006.01) |
| *C04B 35/50* | (2006.01) |
| *H01G 4/10* | (2006.01) |
| *H01G 4/30* | (2006.01) |
| *H01G 4/12* | (2006.01) |

(52) U.S. Cl.
CPC ......... *C04B 35/50* (2013.01); *C04B 2235/3208* (2013.01); *C04B 2235/9615* (2013.01); *C04B 2235/3272* (2013.01); *C04B 2235/3213* (2013.01); *H01G 4/30* (2013.01); *C04B 2235/3215* (2013.01); *C04B 2235/3239* (2013.01); *H01G 4/1254* (2013.01); *C04B 2235/3206* (2013.01); *C04B 2235/3229* (2013.01); *C04B 2235/3225* (2013.01); *C04B 2235/3251* (2013.01); *C04B 2235/79* (2013.01); *C04B 2235/3241* (2013.01); *C04B 2235/3262* (2013.01); *C04B 35/495* (2013.01); *C04B 2235/3256* (2013.01); *C04B 2235/3258* (2013.01); *C04B 2235/76* (2013.01); *C04B 2235/3224* (2013.01); *C04B 2235/3227* (2013.01)

USPC .................. 501/135; 501/152; 361/321.4

(58) Field of Classification Search
CPC .................. C04B 35/495; C04B 35/50; C04B 2235/3224; C04B 2235/3225; C04B 2235/3227; C04B 2235/3229; C04B 2235/3251; C04B 2235/76; H01G 4/1209; H01G 4/1254
USPC .................. 501/135, 152; 361/321.4
See application file for complete search history.

(56) References Cited

U.S. PATENT DOCUMENTS

| | | | | |
|---|---|---|---|---|
| 7,674,738 B2 * | 3/2010 | Kubota | ................ | 501/135 |
| 7,727,921 B2 * | 6/2010 | Takeda | ................ | 501/135 |

(Continued)

FOREIGN PATENT DOCUMENTS

| | | |
|---|---|---|
| CN | 1365121 A | 8/2002 |
| CN | 101531512 A | 9/2009 |
| JP | 2004-342487 A | 12/2004 |

OTHER PUBLICATIONS

Kunio Masuno, "X-Ray and Dielectric Studies of the Systems (Ba1-xR2x/3)Nb2O6, Where R is Y, Sm or La", Journal of the Physical Society of Japan, Mar. 1964, vol. 19, No. 3, pp. 323-328.

(Continued)

*Primary Examiner* — Karl Group
(74) *Attorney, Agent, or Firm* — Arent Fox LLP

(57) ABSTRACT

Dielectric ceramic composition comprising a compound shown by a general formula $\{A_{1-x}(RE)_{2x/3}\}_y\text{-}B_2O_{5+y}$ and has a tungsten bronze-type structure. In the formula, "A" is at least one selected from a group comprising Ba, Ca, Sr and Mg, "B" is at least one selected from Nb and Ta, "RE" is at least one selected from Sc, Y, La, Ce, Pr, Nd, Sm, Eu, Gd, Tb, Dy, Ho, Er, Tm, Yb and Lu, and said "x" and "y" satisfies 0<x<1 and y>1.000, respectively. The dielectric ceramic composition further comprises an oxide of at least one selected from V, Mo, Fe, W, Mn and Cr.

4 Claims, 1 Drawing Sheet

(56) References Cited

U.S. PATENT DOCUMENTS 7,742,278 B2 * 6/2010 Takeda .................. 361/321.2
2002/0132127 A1 9/2002 Naito

OTHER PUBLICATIONS

Naoki Wakiya et al., "Synthesis and Dielectric Properties of Ba1-xR2x/3Nb2O6 (R:Rare Earth) with Tetragonal Tungsten Bronze Structure", Lournal of the European Ceramic Society, 1999, vol. 19, pp. 1071-1075.

Wataru Sakamoto et al., "Chemical Solution Processing and Characterization of Highly Oriented (Ba,Ln)Nb2O6 [Ln:La, Gd, Dy] Thin Films", Lpn. J. Appl. Phys., 2002, vol. 41, pp. 6647-6652.

Wataru Sakamoto et al., "Chemical Solution Processing and Properties of Tungsten Bronze (Ba,La)Nb2O6 Thin Films", Integrated Ferroelectrics, 2001, vol. 36, pp. 191-200.

* cited by examiner

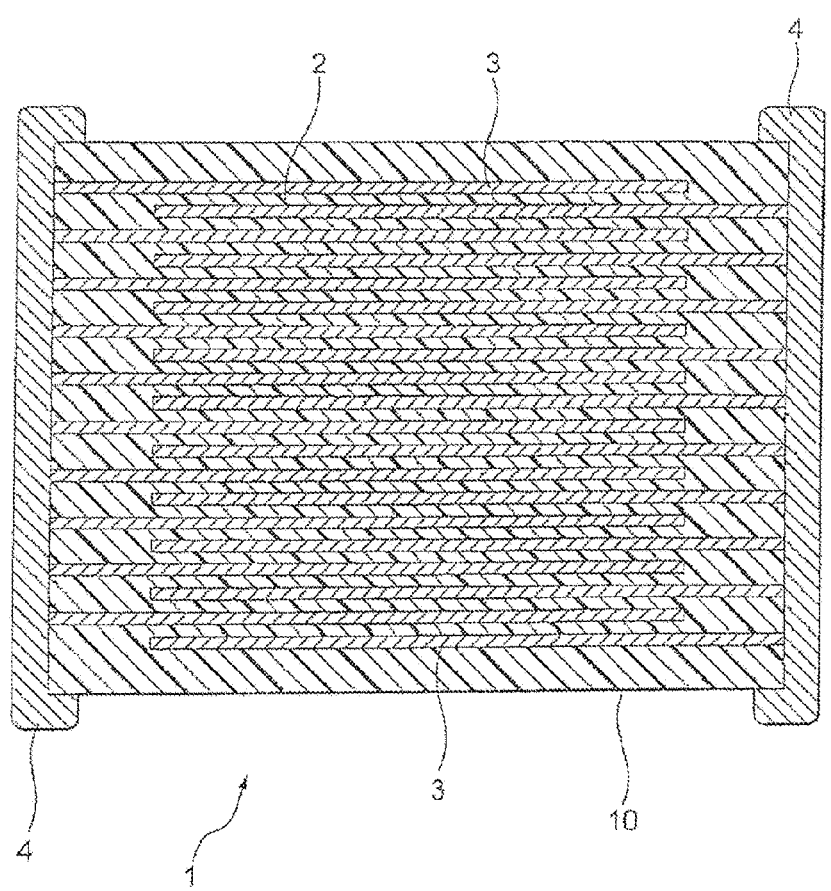

DIELECTRIC CERAMIC COMPOSITION AND ELECTRONIC DEVICE

CROSS-REFERENCE TO RELATED APPLICATION

This application is based upon and claims the benefit of priority of the prior Japanese Patent Application No. 2012-044014, filed Feb. 29, 2012, the disclosure of the prior application is hereby incorporated in its entirety by reference.

BACKGROUND OF THE INVENTION

1. Field of the Invention

The present invention relates to a dielectric ceramic composition and electronic device wherein said dielectric ceramic composition is applied to its dielectric layer. More precisely, the present invention relates to a dielectric ceramic composition having good characteristics under a high electric field intensity, and to an electronic device, wherein said dielectric ceramic composition is applied to dielectric layer, having an electrode.

2. Description of the Related Art

In recent years, a demand for a high reliability of electronic device is high. For instance, size reduction and high performance of multilayer ceramic capacitor, an example of electronic device, is rapidly processing; while its use is expanding. As a result, various characteristics are required for such capacitors.

Conventionally, ceramic composition showing ferroelectricity (ferroelectrics), such as barium titanate, is often used for dielectric layer of electronic device, such as capacitor.

However, when electronic device having dielectric layer of ferroelectrics is used under a high rated voltage, namely, when it is used under a high field intensity, various problems due to ferroelectricity of the ceramic composition were caused.

For instance, there was a problem that specific permittivity rapidly decreases as field intensity increases; and as a result, effective capacitance under used environment decreases. In addition, there was a problem that cracks or noises due to electrostriction generate. There was also a problem such as a deterioration of capacitance change rate with respect to temperature.

Therefore, dielectric ceramic composition having good characteristics (such as specific permittivity) is required, even when field intensity is high (e.g. superimposed direct current).

Further, a high insulation resistance of dielectric ceramic composition is required in order to improve reliability of electronic devices. However, although said insulation resistance can be controlled by controlling firing atmosphere, there were problems such as a matter of facilities and processes. Accordingly, there was a demand for a dielectric ceramic composition which shows a high insulation resistance with no atmosphere adjustment and with a simple firing in air.

The below descried Article 1 describes a compound wherein rare-earth element is solid solved in $BaNb_2O_6$ having tungsten bronze-type structure.

[Article 1] Kunio Masuno, "X-Ray and Dielectric Studies of the Systems $(Ba_{1-x}R_{2x/3})Nb_2O_6$, Where R is Y, Sm or La", Journal of the Physical Society of Japan, 1964, Vol. 19, No. 3, p. 323-328

SUMMARY OF THE INVENTION

The present invention has been made by considering the above circumstances, and a purpose of the present invention is to provide a dielectric ceramic composition having good characteristics under high electric field intensity and good insulation resistivity when firing in air and to an electronic device, wherein said dielectric ceramic composition is applied to dielectric layer, having an electrode.

In order to achieve the above purpose, dielectric ceramic composition according to the present invention comprises a compound shown by a general formula $\{A_{1-x}(RE)_{2x/3}\}_y\text{-}B_2O_{5+y}$ having tungsten bronze-type structure, wherein said A is at least one selected from Ba, Ca, Sr and Mg, said B is at least one selected from Nb and Ta, said RE is at least one selected from Sc, Y, La, Ce, Pr, Nd, Sm, Eu, Gd, Tb, Dy, Ho, Er, Tm, Yb and Lu, and said "x" and "y" satisfies $0<x<1$ and $y>1.000$, respectively.

In the present invention, "y" in the above tungsten bronze-type structured compound showing mole ratio of "A" element and "RE" element with respect to "B" element, is more than 1.000. This will allow the above compound to show good insulation resistivity when firing in air; and that dielectric ceramic composition of a high insulation resistivity can be obtained.

Note that the above compound shows relatively low specific permittivity when field intensity is low (e.g. when direct current is not superimposed). However, said compound is paraelectric and that there is little decline in its specific permittivity even when field intensity increases, which differs from ferroelectrics of barium titanate and the like. Therefore, under a high field intensity, dielectric ceramic composition of the invention show better characteristics (e.g. specific permittivity) than ferroelectrics.

Preferably, the composition further comprises oxide of at least one selected from V, Mo, Fe, W, Mn and Cr.

This allows further improvement of insulation resistivity.

Further, electronic device according to the present invention comprises a dielectric layer, composed of dielectric ceramic composition described any of the above, and an electrode. Although electronic device is not particularly limited, electronic device used under a high rated voltage is preferable. A multilayer ceramic capacitor, such as surface mount device (SMD) chip type electronic device, is exemplified for such electronic device.

BRIEF DESCRIPTION OF THE DRAWINGS

FIG. 1 is a cross-sectional view of a multilayer ceramic capacitor according to an embodiment of the present invention.

DETAILED DESCRIPTION OF THE INVENTION

Hereinafter, the present invention will be described based on embodiments shown in drawings.

(Multilayer Ceramic Capacitor 1)

As is shown in FIG. 1, multilayer ceramic capacitor 1 has a capacitor element body 10 in which dielectric layers 2 and internal electrode layers 3 are alternately stacked. On both ends of capacitor element body 10, a pair of external electrodes 4 is respectively conducted to internal electrode layers 3, alternately stacked within capacitor element body 10. Although a shape of capacitor element body 10 is not particularly limited, it is generally a rectangular parallelpiped. Further, its size is also not particularly limited and may be a suitable size according to its use.

(Dielectric Layer 2)

The dielectric layer 2 is constituted from a dielectric ceramic composition according to the present embodiment. The dielectric ceramic composition is shown by a general formula $\{A_{1-x}(RE)_{2x/3}\}_y$-$B_2O_{5+y}$ and comprises a compound having tungsten bronze-type structure.

Said compound is a compound wherein "A" element in $A_yB_2O_{5+y}$ compound having tungsten bronze-type structure is substituted (solid solved) for "RE" element. In the present embodiment, said compound is paraelectric. With this paraelectricity of said compound, said dielectric ceramic composition may show superior DC bias characteristic, show a small capacitance change rate with respect to temperature, and prevent crack or noise due to electrostriction.

"X" shows substituted amount of "RE" element with respect to "A" element and $0<x<1$. In the present embodiment, "x" is preferably larger than 0.20 and is more preferably 0.33 or more. By determining "x" within the above range, insulation resistivity can be raised.

Further, "x" is preferably less than 0.50, and more preferably 0.43 or less. By determining "x" within the above range, a high contraction ratio can be obtained, and that sintering property of dielectric ceramic composition can be improved.

"y" shows a ratio of "A" and "RE" elements with respect to "B" element, and $y>1.000$. Namely, a total mole number of "A" and "RE" elements is more than mole number of "B" element; and oxygen "O" is biased in response to the ratio. By setting $y>1.000$, dielectric ceramic composition according to the present embodiment shows good insulation resistivity even fired in an air. In addition, said dielectric ceramic composition shows high insulation resistivity even when cofired with an internal electrode, mainly composed of a noble metal, in air.

It is preferable that "y" is 1.002 or more. By setting "y" within the above range, relatively high specific permittivity can be easily obtained while obtaining a good insulation resistivity. Further, it is preferable that "y" is 1.200 or less. By setting "y" within the above range, relatively high specific permittivity can be easily obtained while obtaining a good insulation resistivity.

In the present embodiment, "A" element in the above general formula is at least one selected from Ba, Ca, Sr and Mg; and Ba is preferable.

Further, "B" element is at least one selected from Nb and Ta; and Nb is preferable.

"RE" element is at least one selected from Sc, Y, La, Ce, Pr, Nd, Sm, Eu, Gd, Tb, Dy, Ho, Er, Tm, Yb and Lu; and La is preferable. By including "RE" element, relatively high specific permittivity can be easily obtained while maintaining paraelectric.

In the present embodiment, said dielectric ceramic composition is preferable to comprise an oxide of at least one selected from V, Mo, Fe, W, Mn and Cr in addition to the above compound. By including such oxide, sintering property of dielectric ceramic composition can be improved.

In addition, the composition is preferable to include at least V oxide, and is particularly preferable to include both V oxide and Mn oxide. By including such oxides, sintering property can be improved even when firing temperature is low.

Content of oxide of at least one selected from V, Mo, Fe, W, Mn and Cr, with respect to 100 moles of said compound is preferably 0.05 to 5 moles in terms of element.

Dielectric ceramic composition according to the present embodiment may further include the other composition in accordance with its desired characteristic.

In the present embodiment, crystal particle diameter of dielectric particles may be determined in accordance with thickness of dielectric layer 2 and the like. Further, thickness of dielectric layer 2 may be suitably determined according to its use and the like. Multilayered number of dielectric layer 2 may also be suitably determined according to its use and the like.

(Internal Electrode Layer 3)

Conducting material included in internal electrode layer 3 is not particularly limited. A well-known conducting material as a noble metal, such as Ag, Pd, Pt and Ag—Pd alloys, can be used when cofired with dielectric ceramic composition. Further, when internal electrode layer 3 is formed by sputtering and the like or when internal electrode layer 3 is formed after firing dielectric layer, well-known base metals can be used as conducting materials. Thickness of internal electrode layer 3 is suitably determined according to its use and the like.

(External Electrode 4)

Conducting material included in external electrode 4 is not particularly limited, and well-known conducting materials, such as Ni, Cu and alloys thereof can be used. Thickness of external electrode 4 may be suitably determined in accordance with its use and the like.

(Manufacturing Method of Multilayer Ceramic Capacitor 1)

Multilayer ceramic capacitor 1 according to the present embodiment may be manufactured by a well-known method. In the present embodiment, green chip is manufactured by using paste, and then by firing them, a multilayer ceramic capacitor is manufactured. Manufacturing method will be concretely described below.

Firstly, dielectric material for forming dielectric layer is prepared, and then made to a paste in order to prepare a dielectric layer paste.

In the present embodiment, raw materials of a compound shown by a general formula $\{A_{1-x}(RE)_{2x/3}\}_y$-$B_2O_{5+y}$ is prepared, and then made to dielectric raw materials. If needed, a raw material of oxide of at least one selected from V, Mo, Fe, W, Mn and Cr may be prepared, and then mixed with raw material of said compound, making the dielectric raw materials.

As for raw materials of the above compound or oxide; oxides, their mixtures and their composite oxides may be used. Further, variety of compounds which become the above oxides or composite oxides after firing may also be used.

For instance, as for raw material of the above compound, oxide or carbonation of "A" element, oxide or hydroxide of "RE" element and oxide of "B" element may be prepared. Preliminary fired material, obtained by weighing these oxides et al. to be a predetermined composition, mixing the composition, and preliminary firing the mixture at predetermined temperature, may be dielectric raw materials.

Dielectric layer paste is obtained by kneading raw materials of the above described conductive materials, binder and solvent. Well-known materials can be used for the binder and the solvent. Said paste may include additives such as plasticizer, if required.

Internal electrode paste is obtained by kneading the above described dielectric raw materials, binder and solvent. Well-known materials can be used for the binder and the solvent. Said paste may include additives such as inhibitor and plasticizer, if required.

External electrode paste may be prepared in the same way as the internal electrode paste is prepared.

Green sheet and internal electrode pattern are formed by using the obtained pastes, and then green chip is obtained by laminating the same.

The binder removal process is performed to the obtained green chip, if required. Binder removal process condition may be a well-known condition, and for instance, a holding temperature is preferably 180 to 400° C.

After a binder removal processing, green chip is fired and a capacitor element body as a sintered body is obtained. In the present embodiment, firing in air is performed. The other firing conditions may be well-known conditions, and for instance, a holding temperature is preferably 1150 to 1350° C.

End surface polishing is performed to the above obtained capacitor element body, external electrode paste is pasted and then baked, and external electrode 4 is formed. A cover layer is then formed by plating, etc. on the surface of the external electrode 4, when necessary.

A multilayer ceramic capacitor of the present embodiment produced as above is mounted on a printed substrate, etc. by such as soldering, and used for a variety of electronic apparatuses, etc.

An embodiment of the present invention is explained above, but the present invention is not limited to the above embodiment and may be variously modified within the scope of the present invention.

For instance, in the above embodiment, a multilayer ceramic capacitor is explained as an example of ceramic electronic device according to the present invention, but ceramic electronic device according to the present invention is not limited to the multilayer ceramic capacitor and may be any as far as it includes the above constitution.

EXAMPLE

Below, the present invention will be explained based on furthermore detailed examples, but the present invention is not limited to the examples.

Example 1

At first, a compound powder shown by a general formula $\{A_{1-x}(RE)_{2x/3}\}_y\text{-}B_2O_{5+y}$ was prepared, and this was determined as dielectric raw materials. In the general formula, "A" element is Ba, "RE" element is La, "B" element is Nb, "x" is 0.40 and "y" is the values shown in Table 1.

Next, ion-exchange water and polyvinyl alcohol were poured in a container, mixed for 2 hours at 85° C., and then polyvinyl alcohol aqueous solution was obtained. Concentration of the aqueous solution was made to 6 wt % by regulating an amount of ion-exchange water.

20 wt % of polyvinyl alcohol aqueous solution with respect to 100 wt % of the prepared dielectric raw materials was added, mixed and granulated in a mortar, and then granulated powder was obtained. The obtained granulated powder was poured into a mold of Φ11.1 mm, press formed under a pressure of 10 kg/cm², and then a disk-shaped green compact was obtained.

Next, the obtained green compact was fired in air and a disk-shaped sintered body was obtained. Firing conditions were a temperature rising rate of 200° C./h, a holding temperature of 1300° C., and a holding time of 2 hours.

Contraction ratio of the obtained sintered body was measured by methods described below. Measurements are shown in Table 1. Subsequently, In—Ga electrode of Φ6 mm was coated on both principal surfaces of the sintered body, baking treatment was performed, and then, disk-shaped ceramic capacitor sample was obtained.

Further, in example 1, capacitor sample was manufactured using a compound shown by a general formula $BaTiO_3$, for a comparison of the above samples. First, powder of the compound was prepared as dielectric raw materials. Disk-shaped ceramic capacitor sample was prepared by the same method as the above samples, except the above powder was used.

Specific permittivity, insulation resistivity and DC-Bias characteristics of the obtained each capacitor sample were respectively evaluated by the methods described below. Evaluation results are shown in Table 1. Note that specific permittivity and DC-Bias characteristic of capacitor sample, using compound shown by a general formula $BaTiO_3$, were evaluated.

(Contraction Ratio)

First, diameter R of the obtained sintered body was measured. Then, contraction ratio was calculated by the following formula based on diameter RA and diameter R of mold.

contraction ratio(%)=100×(RA−R)/RA

A large contraction ratio indicates a high density of sintered body. Moisture resistance improves when density of sintered body is raised; and that electronic devices suitably used even under a high-humidity environment can be obtained. In addition, hardness of the sintered body improved as its density was heightened, which made it possible to prevent structural deficiency. In the present examples, contraction ratio of 17% or more was determined good. Results are shown in Table 1.

(Specific Permittivity)

Capacitance C of a capacitor sample was measured under frequency of 1 kHz and measured voltage of 1 Vrms at reference temperature of 25° C. using 4284A by HP Co. Then, specific permittivity was calculated by thickness of a sintered body, effective electrode area, and capacitance C, which was obtained from the measurement. In the present examples, a high specific permittivity is preferable and 250 or more is more preferable. Results are shown in Table 1.

(Insulation Resistivity)

Insulation resistance of capacitor sample was measured by using 4339B HIGH RESISTANCE METER by HP Co. and 16339A COMPONENT TEST FIXTURE by HP Co., and then insulation resistivity was calculated. Measured conditions were applied voltage of 50 V and applied time of 30 sec. A high insulation resistance can be obtained when insulation resistivity is high. This offers advantages such that, even under high electric field intensity, charges are difficult to be cleared and that accumulated energy in capacitor will not be lost. In the present example, insulation resistivity of $1.0 \times 10^{11}$ (Ω·m) or more was determined good. When insulation resistivity is less than $1.0 \times 10^{11}$ (Ω·m), leak current will become large and electric characteristic could have been deteriorated. Results are shown in Table 1.

(DC-Bias Characteristic)

First, samples for measuring DC bias characteristic were manufactured. Binder resin and solvent were mixed to the above prepared dielectric raw materials to make paste. Green sheet was formed by using the obtained paste, Pt electrode was printed thereon and binder removal process and firing in air were performed, and then a multilayer ceramic capacitor sample was manufactured. Distance between Pt electrodes (thickness of dielectric layer) was 5 μm and a number of laminated dielectric layers were 4. Capacitance of the obtained samples were measured under a measured condition of frequency at 1 kHz and measured voltage at 1 Vrms with not impressing direct current or with impressing direct current at 20 V/μm. And a change rate of capacitance with not impressing direct current with respect to capacitance with impressing direct current was determined to DC-Bias characteristic. Namely, when DC-Bias characteristic is negative, capacitance decreases as direct current impresses. In the present example, DC-Bias characteristic closest to 0 is preferable, and within ±5% were determined good. Results are shown in Table 1.

TABLE 1

| | $(Ba_{1-x}La_{2x/3})_y Nb_2 O_{5+y}$ | | characteristics of a sintered body | | | |
|---|---|---|---|---|---|---|
| Samples | x | y | Contraction Ratio [%] | Specific Permittivity | Insulation Resistivity [Ω·m] | DC-Bias (20 V/μm) |
| $BaTiO_3$ | — | — | — | 1238 | — | −78% |
| *1 | 0.40 | 1.000 | 16.5 | 429 | 9.0E+10 | −2% |
| 2 | 0.40 | 1.002 | 17.5 | 390 | 1.2E+12 | −2% |
| 3 | 0.40 | 1.010 | 17.4 | 380 | 1.2E+12 | −2% |
| 4 | 0.40 | 1.050 | 17.3 | 340 | 1.2E+12 | −1% |
| 5 | 0.40 | 1.100 | 17.2 | 330 | 1.2E+12 | −1% |
| 6 | 0.40 | 1.200 | 17.1 | 250 | 1.1E+12 | −1% |
| 7 | 0.40 | 1.300 | 16.5 | 199 | 1.2E+12 | −1% |
| 8 | 0.40 | 1.400 | 16.4 | 85 | 1.3E+12 | 0% |
| 9 | 0.40 | 1.500 | 15.5 | 57 | 1.4E+12 | 0% |

"mE+n" indicates "m × $10^n$"
Samples with "*" are reference examples of the invention.

In Table 1, samples 2 to 9 of y>1.000 were confirmed to show insulation resistivity of $1.0 \times 10^{11}$ or more. Namely, samples 2 to 9 were confirmed to show high insulation resistance. Further, DC-Bias characteristic of samples 1 to 9 were superior when compared to samples using $BaTiO_3$ as dielectric raw materials.

In particular, samples 2 to 6 of $1.002 \leq y \leq 1.200$ showed good insulation resistivity, high contraction ratio, and specific permittivity of 250 or more.

On the other hand, sample 1 of y=1.000 showed relatively high specific permittivity and good DC-Bias characteristic, while showing low insulation resistivity of $1.0 \times 10^{11}$ (Ω·m) or less.

Example 2

Samples of ceramic capacitor were manufactured in the same way as sample 2 of Example 1, except using a mixture of a powder of the compound used in example 1 and an oxide powder shown in Table 2 as dielectric raw materials. And then the same evaluation as example 1 was performed. Results are shown in Table 2.

Note that oxide powder content of each samples 20 to 24 was set to be 1.0 mole in terms of element with respect to 100 moles of a compound. Further, a total content of V oxide and Mn oxide in sample 25 was set to be 1.0 mole in terms of element with respect to 100 moles of the compound.

Table 2 indicates that contraction ratio as well as specific permittivity became high, when dielectric ceramic composition includes oxides of V, Mo, Fe, W, Mn and Cr in addition to the above compounds. In particular, it was confirmed that high contraction ratio is shown even under low firing temperature when said dielectric ceramic composition includes V oxide. It was also confirmed that higher contraction ratio is shown even under low firing temperature when said dielectric ceramic composition includes V and Mn oxides simultaneously. Further, by including V oxide, sufficient contraction ratio can be obtained at a low temperature, when compared to the sample (sample 2) of not including oxide.

Example 3

Samples of ceramic capacitor were manufactured in the same way as sample 20 of Example 2, except V oxide content is as shown in Table 3. Results are shown in Table 3. Note that "y" values of samples 26 to 28 are shown in table 3.

TABLE 2

| | $(Ba_{1-x}La_{2x/3})_y Nb_2 O_{5+y}$ | | | | characteristics of a sintered body | | |
|---|---|---|---|---|---|---|---|
| Samples | x | y | Oxide Kind | Firing Temperature [°C.] | Contraction Ratio [%] | Specific Permittivity | Insulation Resistivity [Ω·m] |
| 2 | 0.40 | 1.002 | none | 1300 | 17.5 | 390 | 1.2E+12 |
| 20 | 0.40 | 1.002 | V | 1275 | 18.1 | 411 | 1.3E+12 |
| 21 | 0.40 | 1.002 | Fe | 1300 | 18.0 | 374 | 1.3E+12 |
| 22 | 0.40 | 1.002 | Mo | 1300 | 18.0 | 413 | 1.3E+12 |
| 23 | 0.40 | 1.002 | W | 1300 | 18.3 | 399 | 1.2E+12 |
| 24 | 0.40 | 1.002 | Mn | 1300 | 18.0 | 405 | 1.2E+12 |
| 25 | 0.40 | 1.002 | V, Mn | 1275 | 18.6 | 402 | 1.3E+12 |

"mE+n" indicates "m × $10^n$"

TABLE 3

| Samples | $(Ba_{1-x}La_{2x/3})_y Nb_2 O_{5+y}$ | | Oxide | | characteristics of a sintered body | | | |
|---|---|---|---|---|---|---|---|---|
| | | | | Content | Contraction Ratio | Specific Permittivity | Insulation Resistivity | DC-Bias |
| | x | y | Kind | [mol] | [%] | | [Ω · m] | (20 V/μm) |
| 2 | 0.40 | 1.002 | — | | 17.5 | 390 | 1.20E+12 | −2% |
| 20a | 0.40 | 1.002 | V | 0.01 | 17.5 | 395 | 1.22E+12 | −2% |
| 20b | 0.40 | 1.002 | V | 0.05 | 17.6 | 402 | 1.25E+12 | −2% |
| 20c | 0.40 | 1.002 | V | 0.5 | 18.0 | 405 | 1.28E+12 | −2% |
| 20 | 0.40 | 1.002 | V | 1.0 | 18.1 | 411 | 1.30E+12 | −2% |
| 20d | 0.40 | 1.002 | V | 2.5 | 18.3 | 390 | 1.35E+12 | −2% |
| 20e | 0.40 | 1.002 | V | 5.0 | 18.4 | 370 | 1.28E+12 | −2% |
| 20f | 0.40 | 1.002 | V | 7.0 | 18.5 | 290 | 1.25E+12 | −2% |
| 26 | 0.40 | 1.010 | V | 1.0 | 17.4 | 360 | 1.2E+12 | −2% |
| 27 | 0.40 | 1.300 | V | 1.0 | 16.5 | 170 | 1.2E+12 | −1% |
| 28 | 0.40 | 1.500 | V | 1.0 | 15.3 | 37 | 1.4E+12 | 0% |

"mE+n" indicates "m × 10$^m$"

From table 3, it was confirmed that V oxide content is preferably within a range of 0.05 to 5 mol %. Further, good values could be obtained even when "y" value changed. Note that content of Mo, Fe, W, Mn and Cr oxides are also preferably within a range of 0.05 to 5 mol %.

Example 4

Samples of ceramic capacitor were manufactured in the same way as sample 2 of Example 1, except "x" value in a general formula used in example 1 was as shown in Table 4. And then the same evaluation as example 2 was performed. Results are shown in Table 4.

TABLE 4

| Samples | $(Ba_{1-x}La_{2x/3})_y Nb_2 O_{5+y}$ | | characteristics of a sintered body | | |
|---|---|---|---|---|---|
| | | | Contraction Ratio | Specific | Insulation Resistivity |
| | x | y | [%] | Permittivity | [Ω · m] |
| 30 | 0.20 | 1.002 | 18.1 | 260 | 1.1E+11 |
| 31 | 0.23 | 1.002 | 18.0 | 310 | 1.8E+11 |
| 32 | 0.25 | 1.002 | 17.9 | 350 | 3.0E+11 |
| 33 | 0.30 | 1.002 | 17.8 | 374 | 4.5E+11 |
| 34 | 0.33 | 1.002 | 17.7 | 410 | 9.1E+11 |
| 35 | 0.35 | 1.002 | 17.6 | 400 | 9.8E+11 |
| 2 | 0.40 | 1.002 | 17.5 | 390 | 1.2E+12 |
| 36 | 0.43 | 1.002 | 17.3 | 373 | 1.4E+12 |
| 37 | 0.45 | 1.002 | 16.9 | 350 | 1.5E+12 |
| 38 | 0.48 | 1.002 | 16.5 | 373 | 1.7E+12 |
| 39 | 0.50 | 1.002 | 15.5 | 320 | 1.8E+12 |

"mE+n" indicates "m × 10$^m$"

Table 4 shows that insulation resistivity tends to be higher when "x" become large, while contraction ratio tends to increase when "x" become small.

Further, good insulation resistivity and high contraction ratio as well as a relatively high specific permittivity can be obtained when "x" is larger than 0.2 and less than 0.5. By setting "x" within a range of 0.33 to 0.43, effects of the invention can be further improved.

In the present example, although a single layered capacitor was mainly evaluated, a multilayer ceramic capacitor wherein dielectric layers and internal electrodes are laminated shows the same characteristics as shown by the capacitor samples of the present examples. As mentioned above, multilayer ceramic capacitor is obtained by firing green chip formed by using paste.

The invention claimed is:

1. A dielectric ceramic composition comprising a compound shown by a general formula $\{A_{1-x}(RE)_{2x/3}\}_y\text{-}B_2O_{5+y}$ having tungsten bronze-type structure,
   wherein "A" is at least one selected from Ba, Ca, Sr and Mg, "B" is at least one selected from Nb and Ta, "RE" is at least one selected from Sc, Y, La, Ce, Pr, Nd, Sm, Eu, Gd, Tb, Dy, Ho, Er, Tm, Yb and Lu, and "x" and "y" satisfies 0<x<1 and y>1.000, respectively.

2. The dielectric ceramic composition as set forth in claim 1 further comprising an oxide of at least one selected from V, Mo, Fe, W, Mn and Cr.

3. An electronic device comprising a dielectric layer constituting dielectric ceramic composition as set forth in claim 1 and an internal electrode mainly composed of a base metal.

4. An electronic device comprising a dielectric layer constituting dielectric ceramic composition as set forth in claim 2 and an electrode.

* * * * *